United States Patent
Lincoln et al.

(10) Patent No.: US 10,845,294 B1
(45) Date of Patent: Nov. 24, 2020

(54) SYSTEMS AND METHODS FOR PARTICULATE INGESTION SENSING IN GAS TURBINE ENGINES

(71) Applicant: UNITED TECHNOLOGIES CORPORATION, Farmington, CT (US)

(72) Inventors: David L. Lincoln, Cromwell, CT (US); Wayde R. Schmidt, Pomfret Center, CT (US); Michael J. Birnkrant, Wethersfield, CT (US); Xuemei Wang, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/503,057

(22) Filed: Jul. 3, 2019

(51) Int. Cl.
  *G01N 15/14* (2006.01)
  *G01N 15/06* (2006.01)
  *G01N 15/02* (2006.01)

(52) U.S. Cl.
  CPC ..... *G01N 15/1434* (2013.01); *G01N 15/0211* (2013.01); *G01N 15/06* (2013.01); *G01N 2015/0693* (2013.01); *G01N 2015/1486* (2013.01); *G01N 2015/1493* (2013.01)

(58) Field of Classification Search
  CPC ........... G01N 15/1434; G01N 15/0211; G01N 15/06; G01N 2015/0693; G01N 2015/1486; G01N 2015/1493
  USPC .................. 356/51, 337, 338, 340, 342, 343
  See application file for complete search history.

(56) References Cited

U.S. PATENT DOCUMENTS

| | | | |
|---|---|---|---|
| 4,888,948 A * | 12/1989 | Fisher | G01N 27/60 60/223 |
| 5,164,604 A | 11/1992 | Blair et al. | |
| 7,106,442 B2 | 9/2006 | Silcott | |
| 7,518,710 B2 * | 4/2009 | Gao | G01N 15/1463 356/73 |
| 9,909,971 B2 | 3/2018 | Knobloch et al. | |
| 9,915,600 B2 * | 3/2018 | Walls | G01N 15/1436 |
| 10,018,551 B2 * | 7/2018 | Walls | G01N 15/0205 |
| 10,063,794 B2 | 8/2018 | Prata et al. | |
| 10,458,990 B1 * | 10/2019 | Manautou | C12N 1/14 |
| 2002/0118352 A1 | 8/2002 | Ohzu et al. | |
| 2006/0285108 A1 * | 12/2006 | Morrisroe | F23G 5/10 356/316 |
| 2009/0112519 A1 * | 4/2009 | Novis | F01D 21/14 702/183 |
| 2010/0073173 A1 * | 3/2010 | Zindy | G01N 21/85 340/627 |
| 2011/0179763 A1 * | 7/2011 | Rajamani | F02C 7/057 60/39.092 |

(Continued)

*Primary Examiner* — Roy M Punnoose
(74) *Attorney, Agent, or Firm* — Snell & Wilmer L.L.P.

(57) ABSTRACT

A method of operating a multi-angle, multi-wave array may comprise, emitting a first light at a blue wavelength, emitting a second light at an infrared wavelength, emitting a third light at an ultraviolet wavelength, and detecting a scattered light from each of the first light, the second light, and the third light at a plurality of light sensing devices wherein the detection of scattered light is determinative between categories of foreign object debris including solid objects and particulates including silicate sand, water vapor, dust, volcanic ash, sea-salt aerosol, and smoke.

20 Claims, 10 Drawing Sheets

(56) References Cited

U.S. PATENT DOCUMENTS

| | | | |
|---|---|---|---|
| 2012/0229798 A1* | 9/2012 | Mocnik | G01N 15/1012 356/51 |
| 2013/0025348 A1* | 1/2013 | Rajamani | G01N 33/00 73/28.01 |
| 2018/0136122 A1 | 5/2018 | Birnkrant et al. | |
| 2018/0224373 A1* | 8/2018 | Lincoln | G01N 21/31 |
| 2018/0252654 A1* | 9/2018 | Lincoln | G01N 15/0205 |
| 2018/0298778 A1 | 10/2018 | Dischinger et al. | |
| 2019/0094415 A1 | 3/2019 | Essawy et al. | |

\* cited by examiner

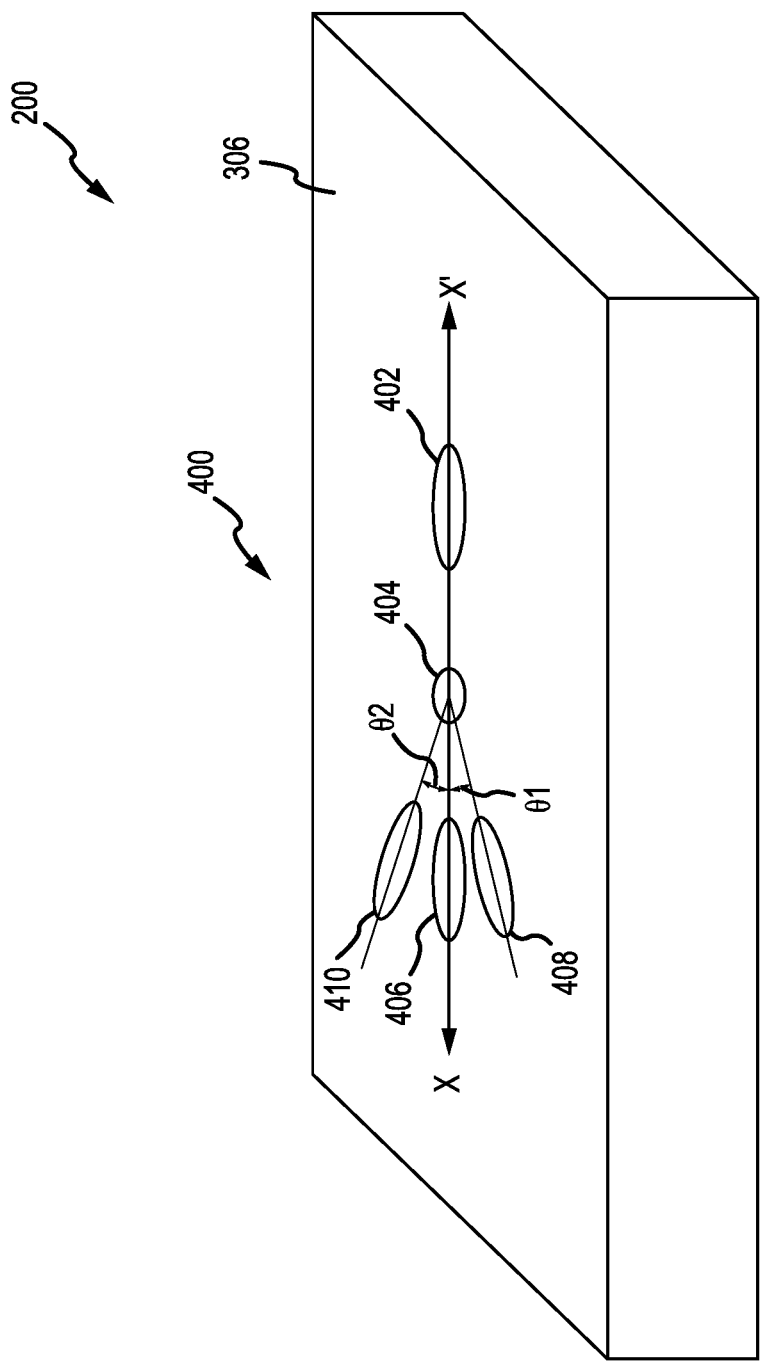

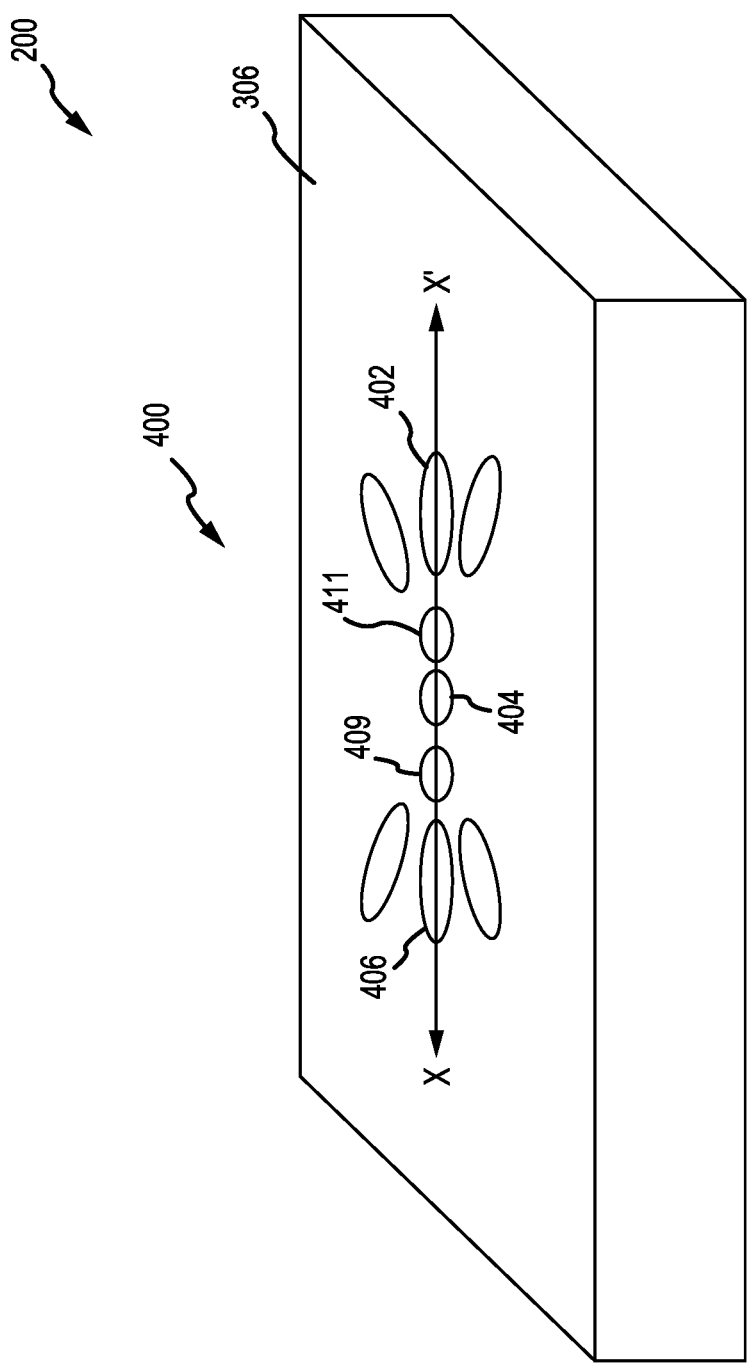

SYSTEMS AND METHODS FOR PARTICULATE INGESTION SENSING IN GAS TURBINE ENGINES

FIELD

The present disclosure relates to air quality sensors and, more specifically, to systems and methods for particulate detection in turbine engine gas path flow.

BACKGROUND

Gas turbine engine components and structures may be sensitive to Foreign Object Debris (FOD) such as, for example, particulate matter. When present in turbine engine gas path flows, particulate matter may tend to result in catastrophic engine failure. Relatively hard and/or dense FOD particles such as, for example, silicate sand, dust, rock, volcanic ash, and/or the like may impact and erode turbine components such as, for example, compressor blades and vanes. In this regard, FOD particles in turbine engine gas paths tend to decrease the operational life and reliability of gas turbine engines.

SUMMARY

In various embodiments, a method of operating a multi-angle, multi-wave array comprises, emitting a first light at a blue wavelength, emitting a second light at an infrared wavelength, emitting a third light at an ultraviolet wavelength, and detecting a scattered light from each of the first light, the second light, and the third light at a plurality of light sensing devices wherein the detection of scattered light is determinative between categories of foreign object debris including solid objects and particulates including silicate sand, water vapor, dust, volcanic ash, sea-salt aerosol, and smoke.

In various embodiments, the method includes comprising a fourth light at an X-ray wavelength and detecting the scattered light from the fourth light. The method may include emitting a fifth light at a wavelength between 400 nm and 2000 nm and detecting scattered light from the fifth light. In various embodiments, the fifth light comprises a P polarized light and an S polarized light each defining respectively orthogonal beamlines. The method may include detecting a P polarized light and an S polarized light from the scattered light of the fifth light. In various embodiments, the fifth light is a laser light. The method may include detection of a back-scatter, a mid-scatter, and a forward-scatter light. In various embodiments, the detection of the scattered light includes detection of a fluorescent light emitted in response to the emission of at least one of the first light, the second light, or the third light. The method may include detection of a fluorescent light emitted in response to the emission of the fourth light.

In various embodiments, the first set comprises a third infrared light source and a third blue light source aligned along the common axis, wherein each of the third infrared light source and the third blue light source have a symmetry axis of a respective emitted light cone perpendicular to a plane defined by the first light sensor, the second light sensor, and the third light sensor. In various embodiments, the second set of sensing elements comprises at least one of a polarized light emitting element or a polarized light detecting element configured to operate at a wavelength between 400 nm and 2000 nm. In various embodiments, the third set of sensing elements comprises a first ultraviolet light emitting element and a first fluorescent light detecting element. In various embodiments, the third set comprises an X-ray emitting source and an X-ray fluorescence detector.

In various embodiments, a system for particulate discrimination is provided. The system may emit a first light at a blue wavelength, emit a second light at an infrared wavelength, and emit a third light at an ultraviolet wavelength. The system may receive a scattered light from each of the first light, the second light, and the third light at a plurality of light sensing devices. The system may discriminate based on the scattered light, between a foreign object debris and a particulate matter. The system may determine based on the scattered light, a quantity, a size, and a type of the particulate matter.

In various embodiments, the type comprises at least one of silicate sand, water vapor, dust, volcanic ash, sea-salt aerosol, steam, and smoke. In various embodiments, the system may emitting a fourth light at an X-ray wavelength. The system may receive at least one of the scattered light from the fourth light or an X-ray fluorescent light emitted in response to the fourth light. The system may determine the quantity, the size, and the type based on at least one of the scattered light from the fourth light or the X-ray fluorescent light. In various embodiments, the system may receive a fluorescent light emitted in response to the emission of at least one of the first light, the second light, or the third light; and determine, the quantity, the size, and the type based on the fluorescent light.

In various embodiments, the system may emit a fifth light at a wavelength between 400 nm and 1100 nm. The system may determine the quantity, the size, and the type based on a P polarization and a V polarization of the scattered light from the fifth light. In various embodiments, the first set of sensing elements emit the first light and the second light, the second set of sensing elements emit a polarized light, and the third set of sensing elements emit the third light.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 4A illustrates a set of sensing elements for a particulate sensor, in accordance with various embodiments;

FIG. 4C illustrates a set of sensing elements for a particulate sensor, in accordance with various embodiments;

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
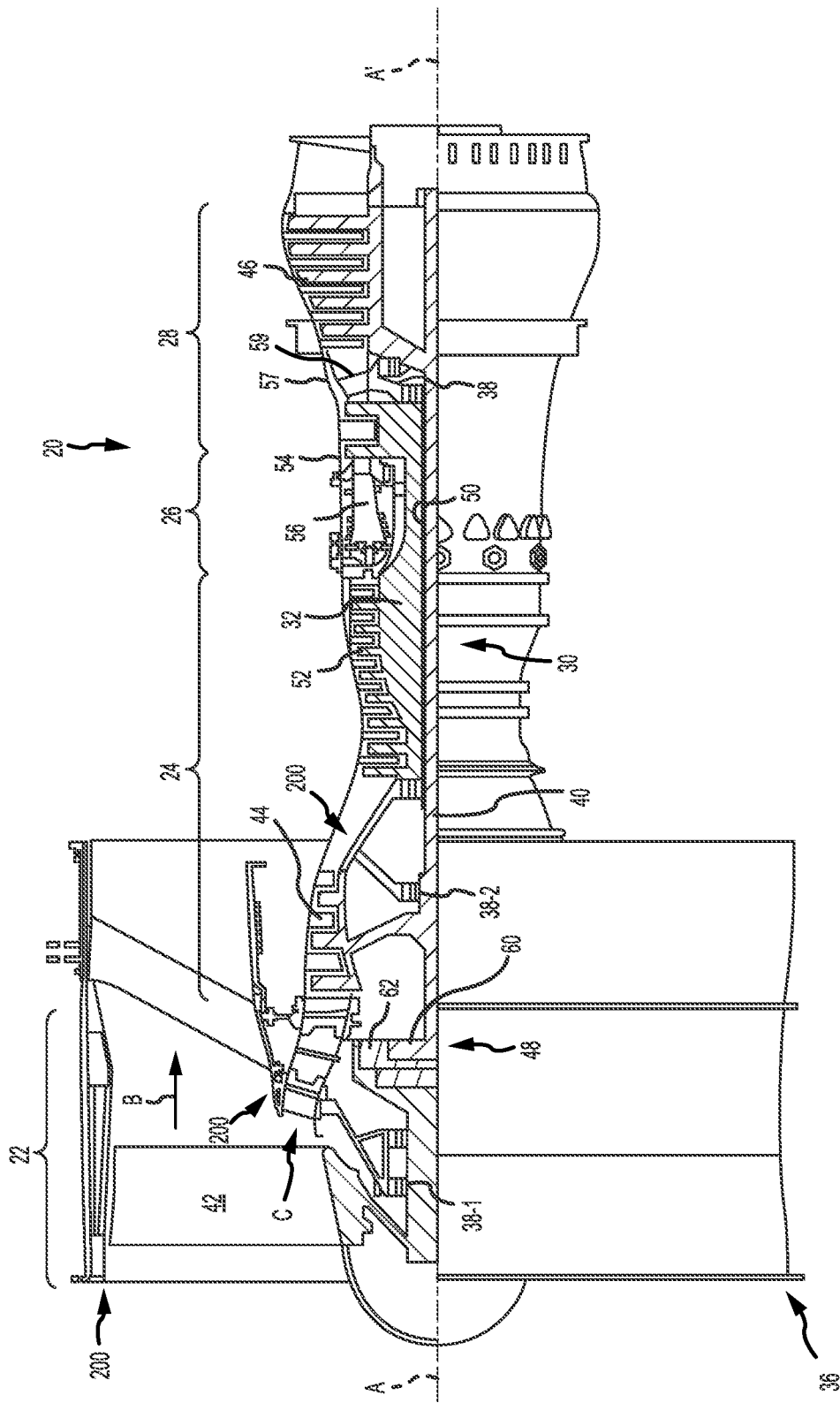
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air through a core flow-path C for compression and communication into combustor section 26 then expansion through turbine section 28. In various embodiments, a plurality of particulate sensor assemblies 200 may be located throughout the turbine engine 20 in the core flow-path C and/or the bypass flow-path B. Although depicted as a turbofan gas turbine engine 20 herein, it should be understood that the concepts described herein are not limited to use with turbofans as the teachings may be applied to other types of turbine engines including turbojet engines, a low-bypass turbofan, a high-bypass turbofan, or any other gas turbine known to those skilled in the art.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 2:
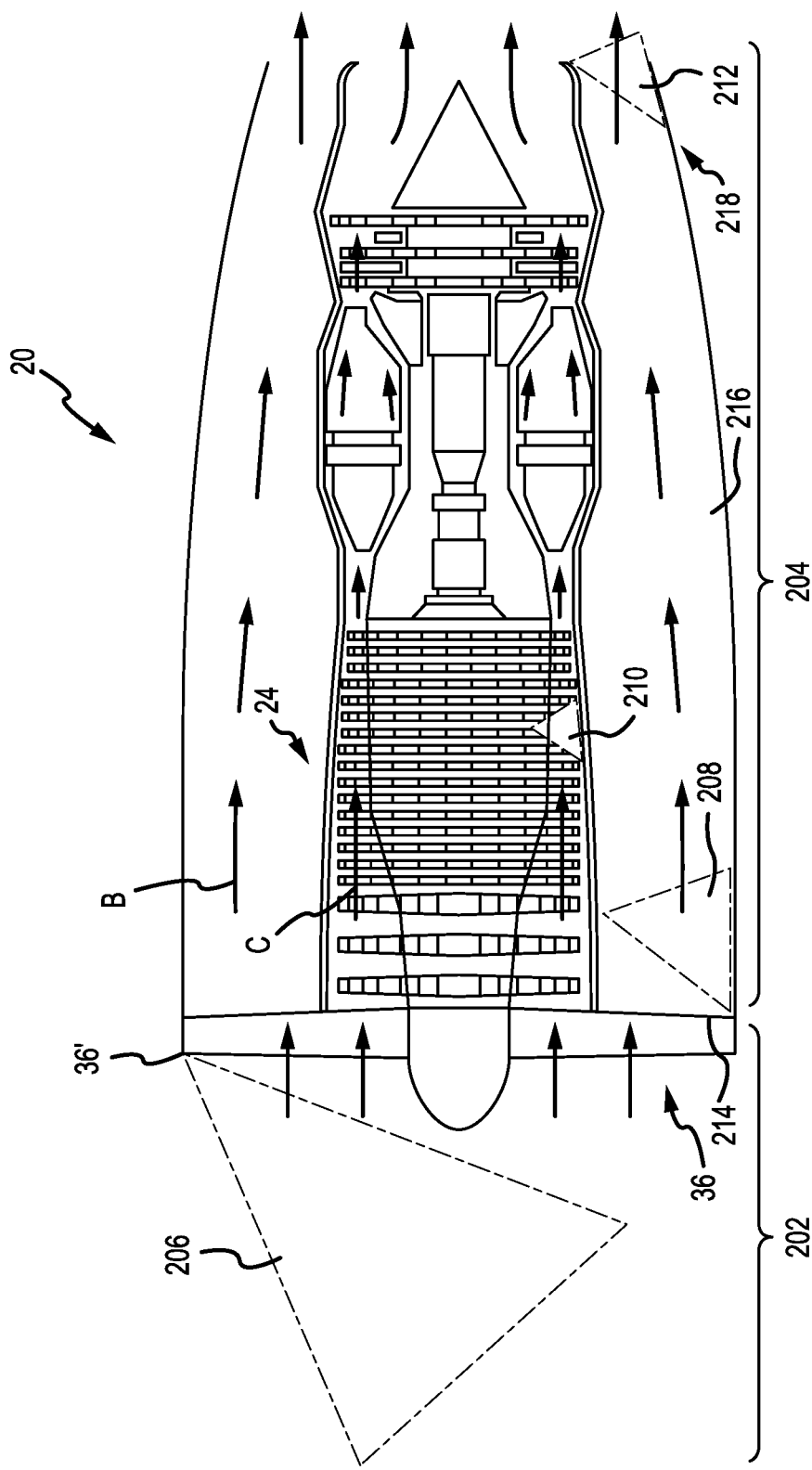
FIG. 2 illustrates particulate sensing volumes for particulate sensor assemblies in a gas turbine engine, in accordance with various embodiments.

With additional reference to FIG. 2, sensing volumes for particulate sensor assemblies 200 of turbine engine 20 are illustrated in various embodiments. Sensing volumes may be defined in an inlet ingestion sensing region 202 and a turbine gas path sensing region 204. For example, a first particulate sensor assembly may be coupled to engine static structure 36 proximate lip 36' to observe a first sensing volume 206 defining the inlet ingestion sensing region 202. A second particulate sensor assembly may be coupled to the engine static structure 36 to observe a second sensing volume 208 within bypass flow-path B proximate the inlet 214 of bypass duct 216. A third particulate sensor assembly may be coupled to compressor section 24 to observe a third sensing volume 210 within core flow-path C. A fourth particulate sensor assembly may be coupled proximate the exit 218 of bypass duct 216 to observe a fourth sensing volume 212 of the bypass flow-path B exhaust and/or the core flow-path C exhaust. It will be appreciated that any number of sensing volumes may be defined by a particulate sensor assembly configured for a particular area of interest.

Figure 3A:
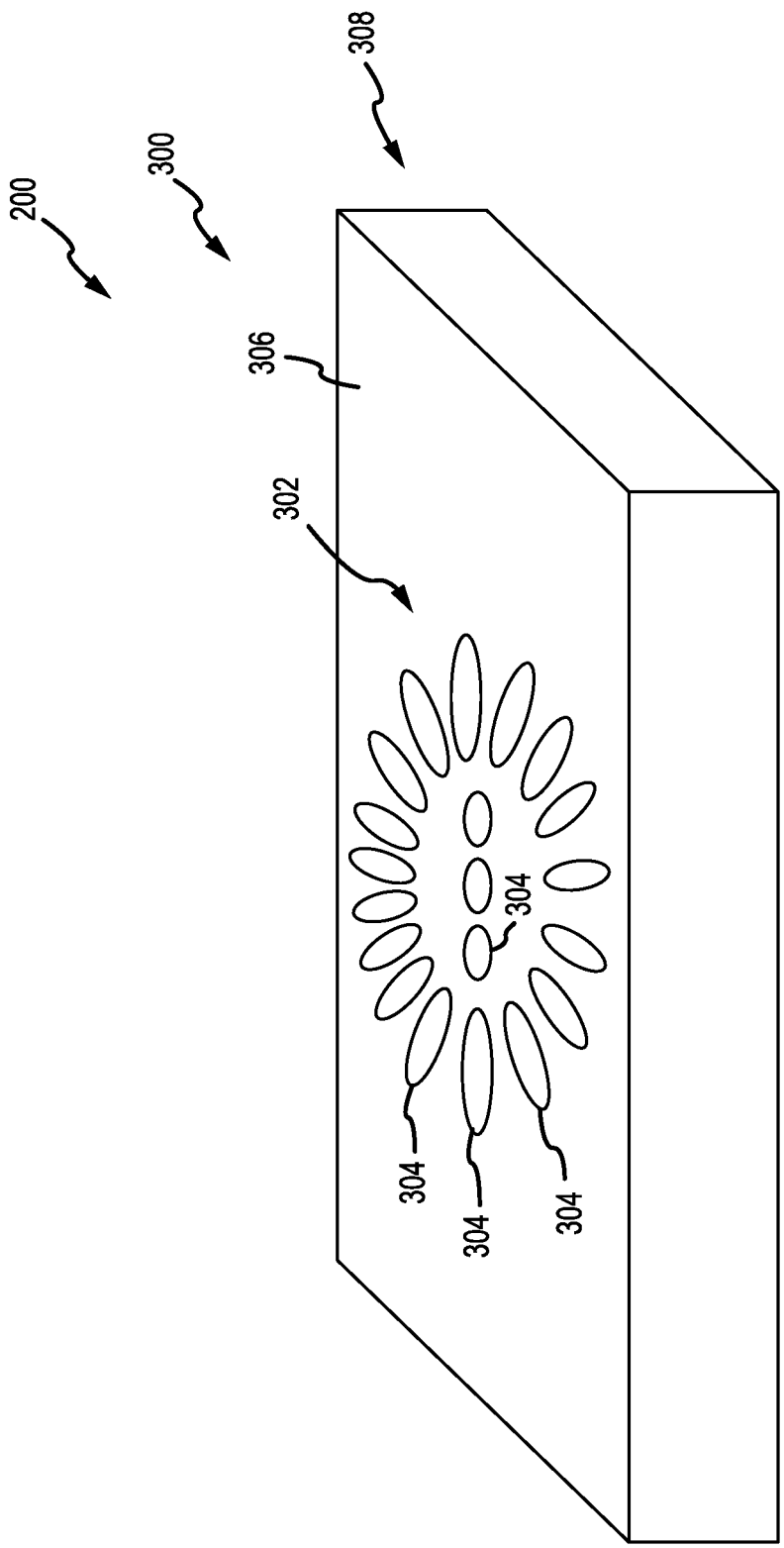
FIG. 3A illustrates a schematic diagram of a multi-angle, multi-wave array of a particulate sensor, in accordance with various embodiments.
Figure 3B:
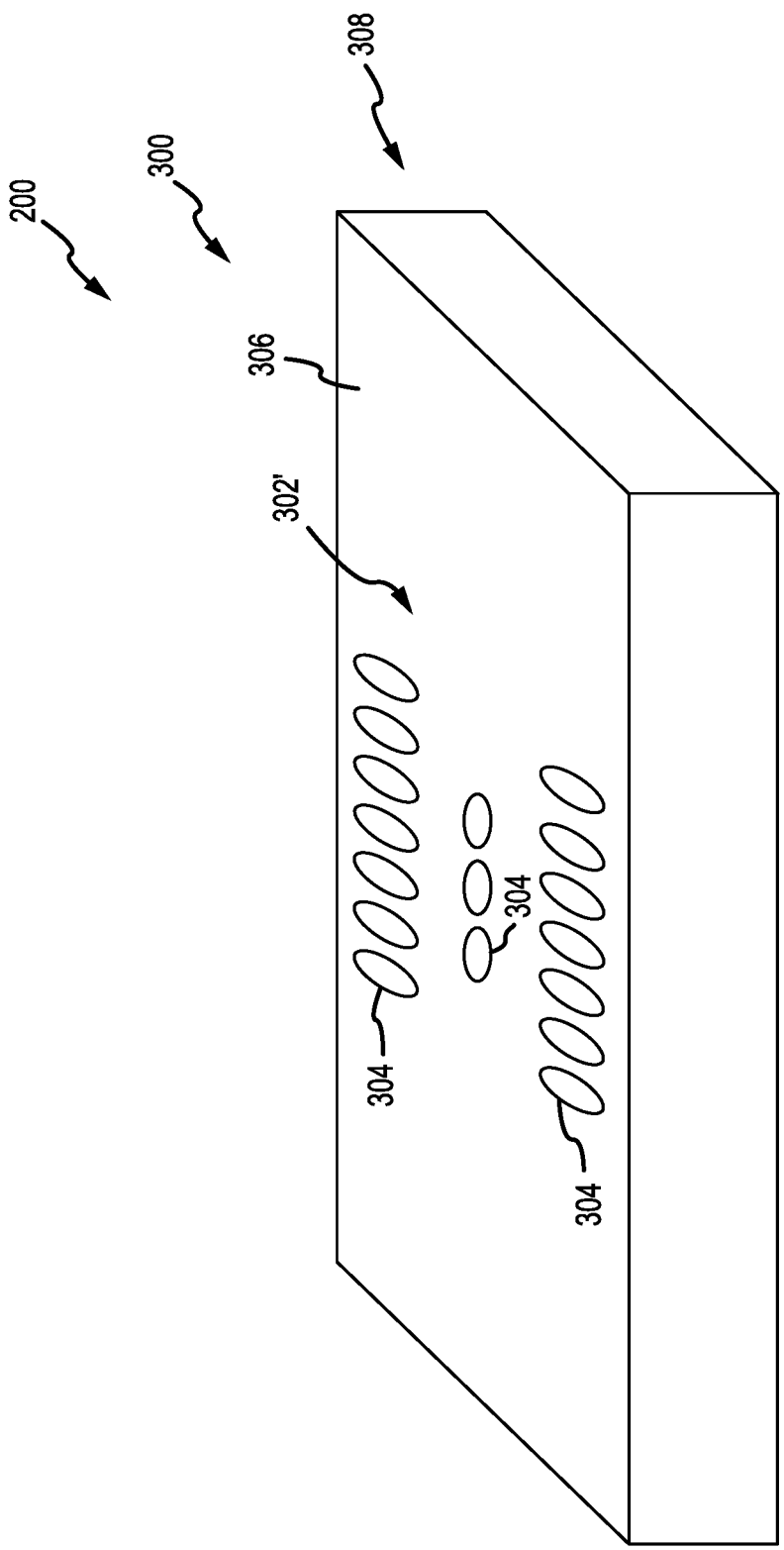
FIG. 3B illustrates a schematic diagram of a multi-angle, multi-wave array of a particulate sensor, in accordance with various embodiments.

With additional reference to FIGS. 3A and 3B, a schematic diagram of a particulate sensor 300 of the particulate sensor assembly 200 is illustrated in accordance with various embodiments. Particulate sensor 300 comprises a multi-angle, multi-wave array (302, 302') of sensing elements 304 comprising a plurality of light sources and a plurality of sensing devices distributed on the sensor face 306 of housing 308. Array (302, 302') may include one or more sets of sensing elements 304 collectively configured to detect and discriminate between categories of FOD including solid objects (e.g., hand tools, hail, rain, fasteners, rocks, etc.) and particulate matter such as, for example, silicate sand, dust, volcanic ash, sea-salt aerosol, smoke, steam, water vapor, and/or the like. Sensing elements 304 may be distributed circumferentially about a center point (e.g., array 302) or may be distributed linearly and/or in a ladder pattern as shown by array 302'. As used herein, particulate matter comprises particles between about 0.01 micron to about 5000 micron where about in this context means ±5%. In various embodiments, for example, dust may be between about 0.05 micron to about 10 micron, volcanic ash may be between about 0.05 micron and about 2000 micron, silicate sand may be between about 4 micron and about 5000 micron. In various embodiments, the housing comprises a protective cover over the multi-angle, multi-wave array 302 tending thereby to increase the durability and longevity of the array 302 when exposed to FOD and particulate matter in the engine 20 flow-paths. The protective cover may be relatively translucent to the light sources and sensing devices of the array (302, 302'). In various embodiments, the protective cover may cover each of sensing elements 304 individually or extend over multiple sensing elements 304. In various embodiments, any of the sensing elements 304 may be configured to emit a pulsed light, or a continuous light, or may be configured to receive light.

With additional reference to FIG. 4A a first set 400 sensing elements 304 of array 302 is illustrated in isolation for clarity. Set 400 includes a first light sensor 402, a second light sensor 404, and a third light sensor 406 each aligned along a common axis X-X'. The light sensors 402, 404, 406 may include, for example, photodiodes and light sensing devices such as Avalanche PhotoDiodes (APDs), Multi-Pixel Photon Counters (MPPCs), and other photodetectors. In various embodiments, common axis X-X' may parallel engine central longitudinal axis A-A' and, in this regard, may be generally aligned with direction airflow in engine 20 flow-paths. Set 400 includes a first infrared light source 408 and a first blue light source 410. The first infrared light source 408 and the first blue light source 410 may be divided by the common axis X-X' and located circumferentially about a center defined by the second light sensor 404. The first infrared light source 408 and the first blue light source 410 may define, respectively, angles θ1 and θ2 between the common axis X-X' with a vertex at a center defined by a position between any of the light sensors on the common axis. Angles θ1 and θ2 may be between 0° and 90°, or may be between 5° and 65°, or may be between 10° and 60°, and/or may be congruent. Each of the angles θ1 and θ2 may be tailored for a desired detection distance, for example, between about 1 cm to 700 cm where about in this context means ±5%. In various embodiments, the vertex of angles θ1 and θ2 may lie along the common axis X-X' at the second light sensor 404, or may between the second light sensor 404 and the first light sensor 402, or may lie at the second light sensor 402. In various embodiments, elements 402, 408, 406, 408, and 410 may lie at an angle with respect to the sensor face 306 (or common axis X-X' in a plane perpendicular to the sensor face 306). In various embodiments, elements 402, 406, 408, and 410 may be between 5° and 60° with respect to the sensor face 306 and element 404 may be between 60° and 120° with respect to the sensor face 306.

In various embodiments, the first light sensor 402 may be used to define a forward-scatter sensing detection volume formed by the overlap of the emission from the first infrared light source 408 and the first blue light source 410 having a first angle of coincidence. The first blue light source 410 may emit light between 380 nm and 600 nm (e.g., a first light). The first infrared light source 408 may emit light at a wavelength between 600 nm and 2000 nm (e.g., a second light). An angle of coincidence may be defined as the angle between the symmetry axis of an emitted light cone of a light source and a symmetry axis of an acceptance cone of a light sensor. Where the light source is pointed directly at the light sensor the angle of coincidence is 180°. It will be appreciated that a scattering angle of light may be calculated by subtracting the angle of coincidence from 180°. The first light sensor 402 may define a forward-scatter sensing detection volume having a first scattering angle of between 0° and 60°. In like regard, the second light sensor 404 may define a mid-scatter sensing detection volume having a second scattering angle of between 60° and 120° and the third light sensor 406 may define a back-scatter sensing detection volume having a third scattering angle between 120° and 240°.

Figure 4B:
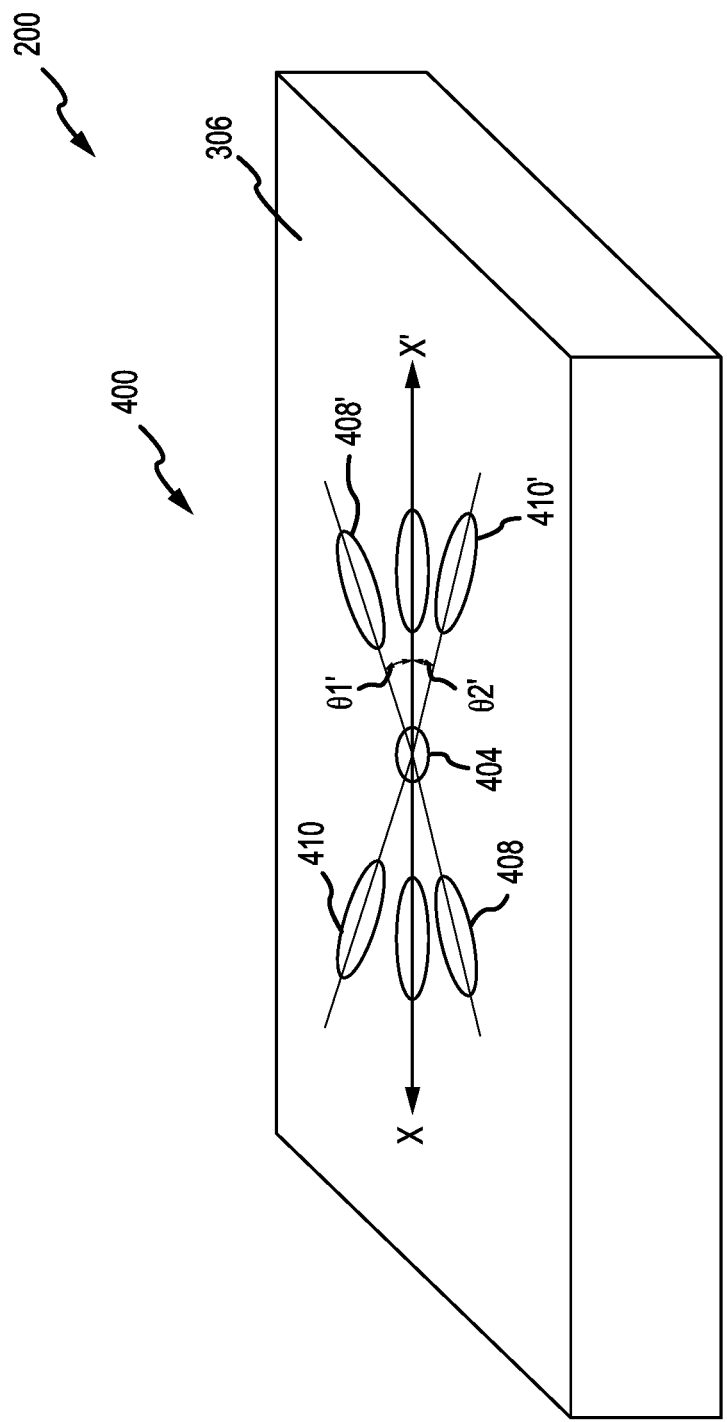
FIG. 4B illustrates a set of sensing elements for a particulate sensor, in accordance with various embodiments.

In various embodiments and with additional reference to FIG. 4B, the first set 400 of sensing elements 304 of array 302 may include a second infrared light source 408' and a second blue light source 410'. The second infrared light source 408' and the second blue light source 410' are divided by the common axis X-X' and located circumferentially about the center defined by the second light sensor 404. The second infrared light source 408' and the second blue light source 410' may define, respectively, angles θ1' and θ2' between the common axis X-X'. In various embodiments, angles θ1 and θ1' may be supplementary and, in like regard, angles θ2 and θ2' may be supplementary. The second infrared light source 408' may emit light at a wavelength between 600 nm and 2000 nm. The second blue light source 410' may emit light between 380 nm and 700 nm.

In various embodiments and with additional reference to FIG. 4C, the first set 400 of sensing elements 304 of array 302 may include a third infrared light source 409 and a third blue light source 411. The third infrared light source 409 and the third blue light source 411 may be positioned along the common axis X-X' relatively between the first light sensor 402 and the third light sensor 406. The third infrared light source 409 may emit light at a wavelength between 700 nm and 2000 nm. The third blue light source 411 may emit light between 250 nm and 700 nm. Each of the third infrared light source 409 and the third blue light source 411 may have a symmetry axis of the respective emitted light cone perpendicular to, or between 60° and 120° of, a plane defined by the sensor face 306 and or the light sensors 402, 404, 406.

Figure 5:
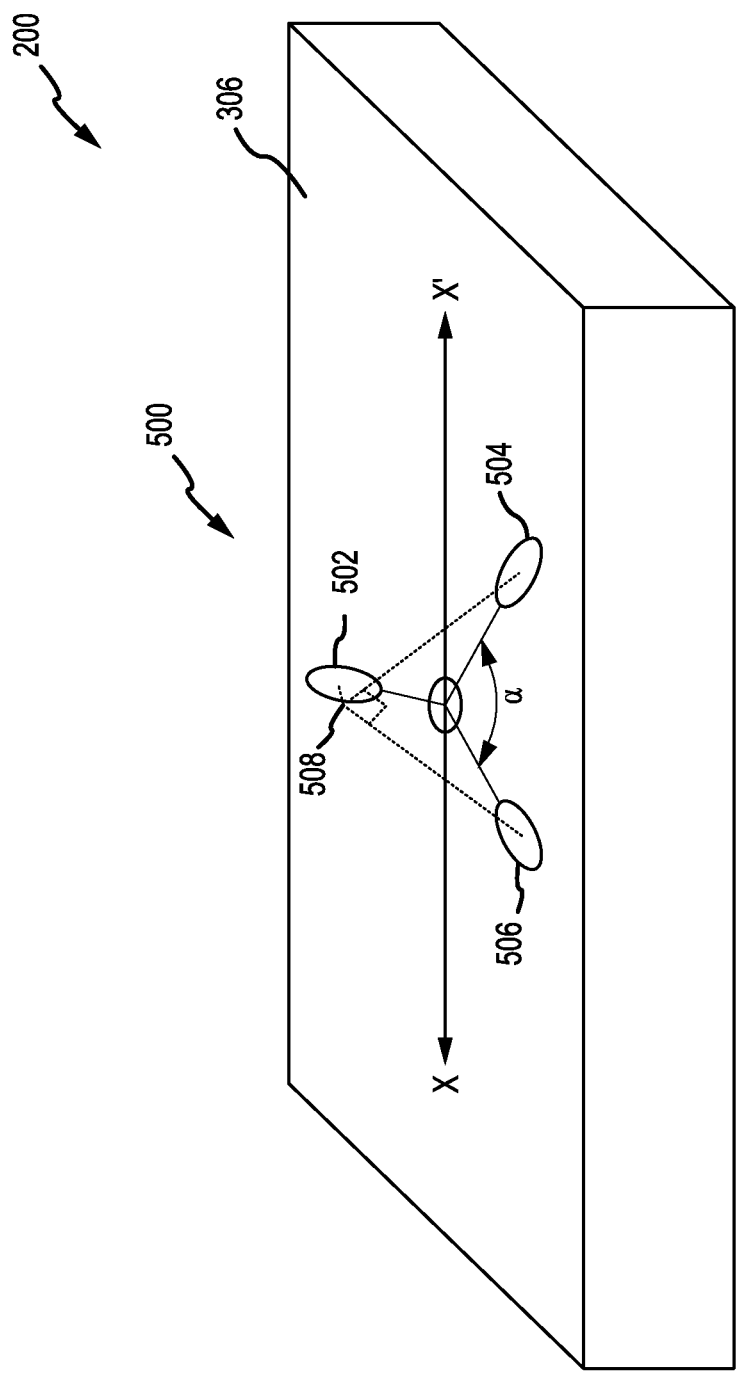
FIG. 5 illustrates a set of sensing elements for a particulate sensor, in accordance with various embodiments.

In various embodiments and with additional reference to FIG. 5, a second set 500 of sensing elements 304 of array 302 comprising at least one of a polarized light emitting element or a polarized light detecting element. It will be appreciated that set 500 may be configured for any combination of elliptical and linear polarization and may include various chirality. Second set 500 may include a first element 502, a second element 504, and a third element 506. Each of the elements (502, 504, 506) may be distributed circumferentially about a vertex 508 defined by an element light cone axis of each of the receiving and/or emitting light cones of each of the elements (502, 504, 506). In various embodiments, the vertex may be projected in the plane of sensor face 306 to the center defined by the second light sensor 404. In various embodiments, the first element 502 is an unpolarized light emitting element, the second element 504 is a S polarization detecting element, and the third element 506 is a P polarization detecting element. In various embodiments, the first element 502 is an unpolarized polarization detector, the second element 504 is a P polarized light emitting element, and the third element 506 is a S polarized light emitting element (or vice versa). The second element 504 and the third element 506 may define an angle α therebetween as a projection of the element light cone axis in the plane of sensor face 306. In various embodiments, the angle α may be 120°. In this regard, the second set 500 may include a V polarized light emitting element with an element light cone axis oriented at 90° to an element light cone axis of the P polarized light emitting element (e.g., respectively orthogonal beamlines). In various embodiments, any of the vertex 508 angles between the light cone axes of the elements may be ±30° from orthogonal (i.e., between 60° and 120°). The elements 502, 504, 506 may be configured to operate at wavelengths between 400 nm and 1100 nm (e.g., a fifth light). The elements 502, 504, 406 may emit a laser light characterized by coherence.

Figure 6:
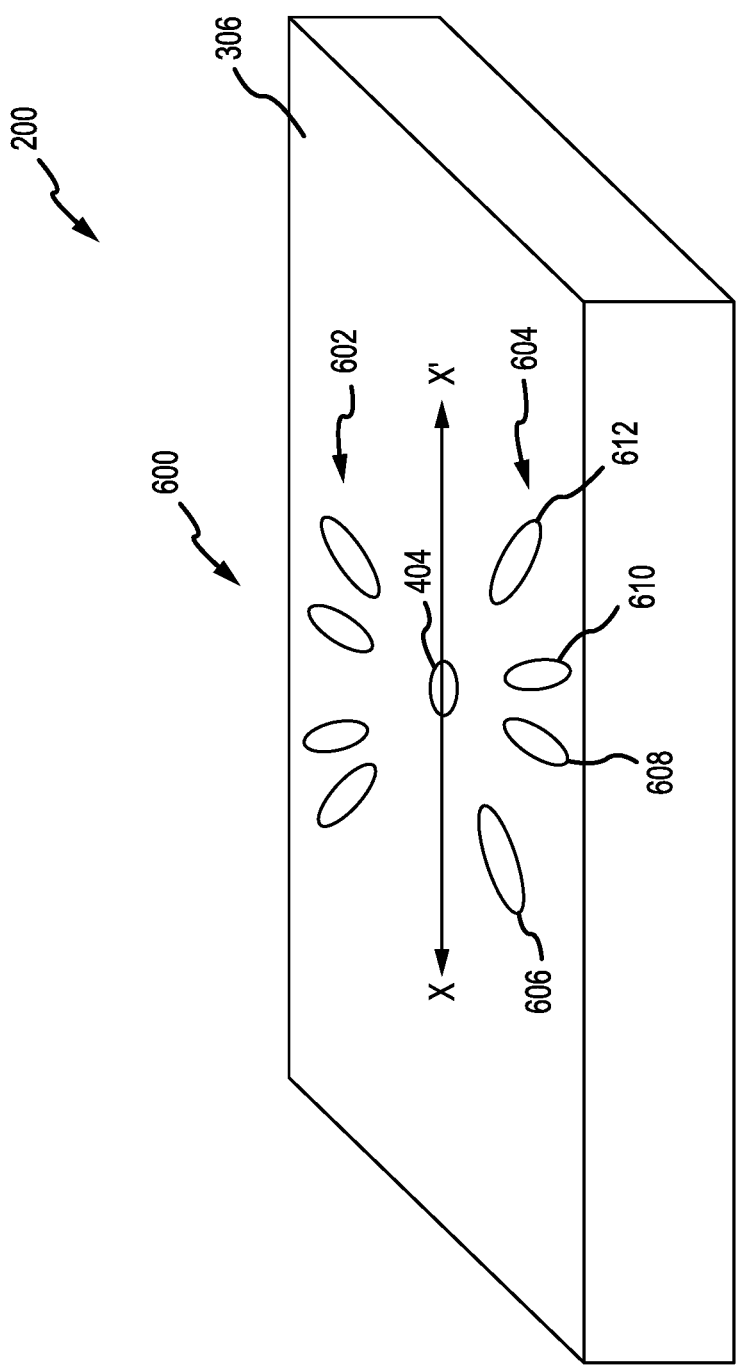
FIG. 6 illustrates a set of sensing elements for a particulate sensor, in accordance with various embodiments.

In various embodiments and with additional reference to FIG. 6, a third set 600 of sensing elements 304 of array 302 is illustrated. The third set 600 includes paired ultraviolet light emitting elements 602 and fluorescent light detecting elements 604 divided by the common axis X-X' and located circumferentially about the center defined by the second light sensor 404. The emitting element and the detecting element of the respective pair may be located relatively circumferentially 180° apart. The emitting elements 602 may be configured to emit ultraviolet light between 220 nm and 405 nm or may be between 405 nm and 900 nm (e.g., a third light). In various embodiments, the fluorescent light detecting elements may comprise one or more filters tending thereby to enable greater discrimination within the fluorescence spectra. For example, detecting elements 604 may include a first filter 606 configured between 330 nm and 370 nm, a second filter 608 configured between 370 nm and 410 nm, a third filter 610 configured between 410 nm and 450 nm, and a fourth filter 612 configured between 460 nm and 500 nm. In various embodiments, the elements 602 may include an X-ray emitting source (e.g., a fourth light) and the elements 604 may include an X-ray fluorescence detector. In various embodiments a scattering angle for a fluorescence detector may be between 5° and 180°.

Figure 7:
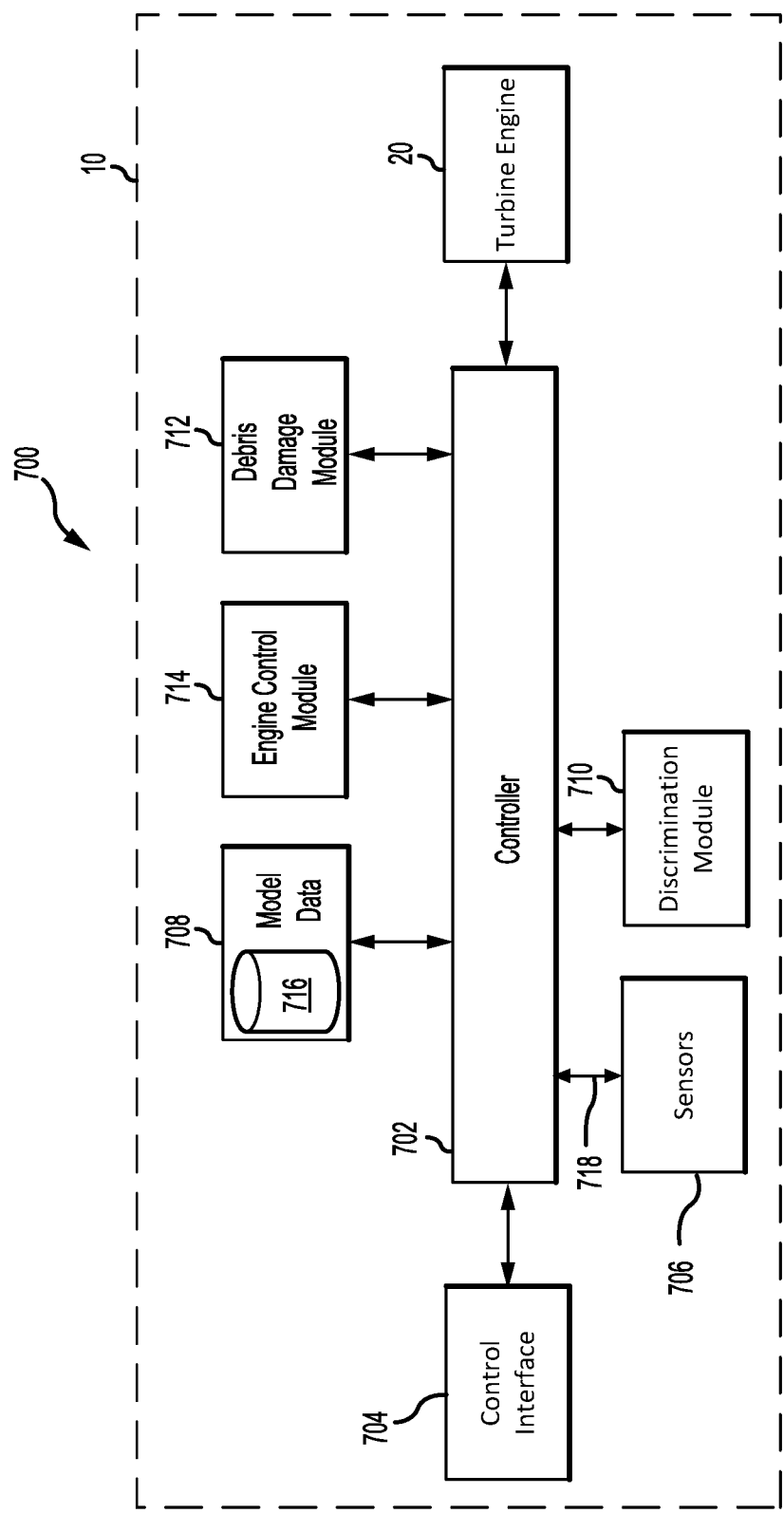
FIG. 7 illustrates a system for particulate discrimination, in accordance with various embodiments.

In various embodiments and with additional reference to FIG. 7, a system 700 for particulate discrimination is illustrated aboard an aircraft 10. System 700 comprises a controller 702 a control interface 704, sensors 706, a database 708, a discrimination module 710, a debris damage module 712, and an engine control module 714.

In various embodiments, controller 702 may be integrated into computer systems onboard aircraft 10. In various embodiments, controller 702 may be configured as a central network element or hub to access various systems, engines, and components of system 700. Controller 702 may comprise a network, computer-based system, and/or software components configured to provide an access point to various systems, engines, and components of system 700. In various embodiments, controller 702 may comprise a processor. In various embodiments, controller 702 may be implemented in a single processor. In various embodiments, controller 702 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 702 may comprise a processor configured to implement various logical operations in response to execution of instructions, for example, instructions stored on a non-transitory, tangible, computer-readable medium configured to communicate with controller 702.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, controller 702 may be in electronic communication with a pilot through a control interface 704, for example, a multifunction display a pilot can operate. The control interface 704 may enable a pilot to interact with system 700 for example, to issue commands, display information such as, for example, warnings, or receive outputs. Control interface 704 may comprise any suitable combination of hardware, software, and/or database components.

In various embodiments, controller 702 may be in electronic communication with sensors 706 including at least one particulate sensor 300. Sensors 706 may comprise a temperature sensor, a torque sensor, a speed sensor, a pressure sensor, a position sensor, an accelerometer, a mass flow sensor, or any other suitable measuring device known to those skilled in the art. Sensors 706 may be configured to measure a characteristic of an aircraft 10 system or component such as gas turbine engine 20. Sensors 706 may include sensors configured to measure atmospheric data or Global Positioning System (GPS) data. Sensors 706 may be configured to transmit measurements to controller 702, thereby providing sensor feedback about the aircraft 10 systems to controller 702. The sensor feedback may be, for example, a speed signal, or may be position feedback, temperature feedback, pressure feedback and/or other data. In various embodiments, sensors 706 include each of the particulate sensor assemblies 200 of turbine engine 20 having the sensing volumes as illustrated with reference to FIG. 2.

Controller 702 may be in electronic communication with database 708. Database 708 may be configured to communicate with controller 702 and to store and maintain data such as sensor data, configuration settings, response models such as, for example, model data 716, and/or the like. Data may be stored or recalled from database 708 in response to commands from controller 702. Data may be stored in database 708 using any suitable technique described herein or known in the art.

Controller 702 may be in electronic communication with discrimination module 710. Discrimination module 710 may receive sensor data 718 from sensors 706 including from particulate sensors 300. Discrimination module 710 is configured to detect and discriminate between categories of foreign object debris including solid objects (e.g., hand tools, hail, rain, fasteners, rocks, etc.) and particulate matter including, for example, silicate sand, dust, volcanic ash, sea-salt aerosol, smoke, steam, water vapor, and/or the like. Discrimination module 710 may discriminate between categories of foreign object debris including solid objects and particulates including silicate sand, water vapor, dust, volcanic ash, sea-salt aerosol, and smoke based on the sensor data 718 and algorithms including the model data 716 which may define the various categories of FOD and particulate matter. Discrimination module 710 may determine a quantity, a size, and a type of the particulate matter. In various embodiments, the sensor data 718 may include GPS data and/or atmospheric data.

Controller 702 may be in electronic communication with debris damage module 712. Debris damage module 712 may receive outputs from the discrimination module 710 and/or the sensor data 718. The debris damage module 712 may be configured to determine a particulate concentration across plurality of particulate sensors within a turbine engine. In this regard, debris damage module 712 may determine a quantity or time-based map of ingested particles between an inlet and an exhaust of a bypass flow-path or a core flow-path. The debris damage module 712 may determine a hazard level for a given particulate type and/or concentration. The debris damage module 712 may record debris data based on the hazard level, the particulate type, or the particulate concentration. In various embodiments, the damage module 712 may generate a debris alert or a damage alert via the control interface 704. The damage module 712 may calculate and/or asses an accumulated engine damage using a physics-based model (i.e., a damage model) of turbine engine 20. The damage model may be stored in database 708 as model data 716. The damage model may include modeling of gas turbine engine 20 component erosion based on particulate type. The debris damage module 712 may determine based on the accumulated damage a percentage of engine life remaining or a time before engine failure and display these measures via the control interface 704. The damage module 712 may generate an alert based on accumulated damage a percentage of engine life remaining such as, for example, exceeding a threshold value for either measure.

Controller 702 may be in electronic communication with engine control module 714. Engine control module 714 may be configured to command turbine engine 20. For example, engine control module 20 may enable controller 702 to instruct turbine engine 20 to increase or decrease shaft speeds, fuel flow, vane geometry, alter bypass airflow, set valves, etc. In various embodiments, the controller 702 may control the turbine engine 20 based on debris damage module 712 and/or discrimination module 710 outputs. For example, engine control module may pull fuel flow from turbine engine 20 in response to exceeding an engine damage threshold.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of operating a sensor assembly, comprising:
   emitting a first light at a blue wavelength;
   emitting a second light at an infrared wavelength;
   emitting a third light at an ultraviolet wavelength; and
   detecting a scattered light from each of the first light, the second light, and the third light at a plurality of light sensing devices,
   wherein the detection of scattered light is determinative between categories of foreign object debris including solid objects and particulates including silicate sand, water vapor, dust, volcanic ash, sea-salt aerosol, and smoke,
   wherein the sensor assembly includes a multi-angle, multi-wave array comprising the plurality of light sensing devices,
   wherein each of the first light, the second light, and the third light are emitted concurrently.

2. The method of claim 1, further comprising emitting a fourth light at an X-ray wavelength and detecting the scattered light from the fourth light at the plurality of light sensing devices.

3. The method of claim 2, wherein the detection of the scattered light includes detection of a fluorescent light emitted in response to the emission of the fourth light.

4. The method of claim 1, further comprising emitting a fifth light at a wavelength between 400 nm and 2000 nm and detecting the scattered light from the fifth light at the plurality of light sensing devices.

5. The method of claim 4, wherein the fifth light comprises a P polarized light and an S polarized light each defining respectively orthogonal beamlines.

6. The method of claim 4, further comprising detecting a P polarized light and an S polarized light from the scattered light of the fifth light at the plurality of light sensing devices.

7. The method of claim 4, wherein the fifth light is a laser light.

8. The method of claim 1, wherein the detection of the scattered light includes detection of a back-scatter, a mid-scatter, and a forward-scatter light.

9. The method of claim 1, wherein the detection of the scattered light includes detection of a fluorescent light emitted in response to the emission of at least one of the first light, the second light, or the third light.

10. A system for particulate discrimination, comprising:
    a gas turbine engine;
    a particulate sensor coupled to the gas turbine engine including multi-angle, multi-wave array, comprising a first set of sensing elements, a second set of sensing elements, and a third set of sensing elements;
    and
    a tangible, non-transitory memory configured to communicate with a controller, the tangible, non-transitory memory having instructions stored thereon that, in response to execution by the controller, cause the controller to perform operations comprising:
    emitting, by the controller and via an emitting element, a first light at a blue wavelength;
    emitting, by the controller and via the emitting element, a second light at an infrared wavelength;
    emitting, by the controller and via the emitting element, a third light at an ultraviolet wavelength;
    receiving, by the controller, a scattered light from each of the first light, the second light, and the third light at a plurality of light sensing devices;
    discriminating, by the controller, based on the scattered light, between a foreign object debris and a particulate matter; and
    determining, by the controller, based on the scattered light, a quantity, a size, and a type of the particulate matter,
    wherein each of the first light, the second light, and the third light are emitted concurrently.

11. The system of claim 10, wherein the type comprises at least one of silicate sand, water vapor, dust, volcanic ash, steam, sea-salt aerosol, and smoke.

12. The system of claim 10, wherein the operations further comprise:
    emitting, by the controller and via the emitting element, a fourth light at an X-ray wavelength;
    receiving, by the controller and via the plurality of light sensing devices, at least one of the scattered light from the fourth light or an X-ray fluorescent light emitted in response to the fourth light; and
    determining, by the controller, the quantity, the size, and the type based on at least one of the scattered light from the fourth light or the X-ray fluorescent light.

13. The system of claim 10, wherein the operations further comprise:
    receiving, by the controller and at the plurality of light sensing devices, a fluorescent light emitted in response to the emission of at least one of the first light, the second light, or the third light; and determining, by the controller, the quantity, the size, and the type based on the fluorescent light.

14. The system of claim 10, wherein the operations further comprise:
    emitting, by the controller and via the emitting element, a fifth light at a wavelength between 400 nm and 2000 nm; and
    determining, by the controller, the quantity, the size, and the type based on a P polarization and an S polarization of the scattered light from the fifth light.

15. The system of claim 10, wherein the first set of sensing elements emit the first light and the second light, the second set of sensing elements emit a polarized light, and the third set of sensing elements emit the third light.

16. An article of manufacture including a tangible, non-transitory computer-readable storage medium having instructions stored thereon that, in response to execution by a processor, cause the processor to perform operations comprising:
    emitting, by the processor and via an emitting element, a first light at a blue wavelength;

emitting, by the processor and via the emitting element, a second light at an infrared wavelength;

emitting, by the processor and via the emitting element, a third light at an ultraviolet wavelength;

receiving, by the processor, a scattered light from each of the first light, the second light, and the third light at a plurality of light sensing devices;

discriminating, by the processor, based on the scattered light, between a foreign object debris and a particulate matter; and determining, by the processor, based on the scattered light, a quantity, a size, and a type of the particulate matter, wherein each of the first light, the second light, and the third light are emitted concurrently, wherein the plurality of light sensing devices define a multi-angle, multi-wave array.

17. The article of manufacture of claim 16, wherein the type comprises at least one of silicate sand, water vapor, dust, volcanic ash, sea-salt aerosol, steam, and smoke.

18. The article of manufacture of claim 16, wherein the operations further comprise:

emitting, by the processor and via the emitting element, a fourth light at an X-ray wavelength;

receiving, by the processor and at the plurality of light sensing devices, at least one of the scattered light from the fourth light or an X-ray fluorescent light emitted in response to the fourth light; and determining, by the processor, the quantity, the size, and the type based on at least one of the scattered light from the fourth light or the X-ray fluorescent light.

19. The article of manufacture of claim 16, wherein the operations further comprise:

receiving, by the processor and at the plurality of light sensing devices, a fluorescent light emitted in response to the emission of at least one of the first light, the second light, or the third light; and determining, by the processor, the quantity, the size, and the type based on the fluorescent light.

20. The article of manufacture of claim 16, wherein the operations further comprise:

emitting, by the processor and via the emitting element, a fifth light at a wavelength between 400 nm and 2000 nm; and determining, by the processor, the quantity, the size, and the type based on a P polarization and an S polarization of the scattered light from the fifth light.

* * * * *